United States Patent
Bireaud et al.

(10) Patent No.: US 12,134,313 B2
(45) Date of Patent: Nov. 5, 2024

(54) COOLING MODULE FOR A MOTOR VEHICLE

(71) Applicant: Valeo Systemes Thermiques, Le Mesnil Saint-Denis (FR)

(72) Inventors: Fabien Bireaud, Le Mesnil Saint-Denis (FR); Rémi Tournois, Le Mesnil Saint-Denis (FR); José Trindade, Le Mesnil Saint-Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 146 days.

(21) Appl. No.: 17/784,910

(22) PCT Filed: Dec. 7, 2020

(86) PCT No.: PCT/FR2020/052303
§ 371 (c)(1),
(2) Date: Jun. 13, 2022

(87) PCT Pub. No.: WO2021/116576
PCT Pub. Date: Jun. 17, 2021

(65) Prior Publication Data
US 2023/0008669 A1    Jan. 12, 2023

(30) Foreign Application Priority Data

Dec. 13, 2019  (FR) .................................. 1914376

(51) Int. Cl.
*B60K 11/08* (2006.01)
*B60K 11/02* (2006.01)
(Continued)

(52) U.S. Cl.
CPC .............. *B60K 11/08* (2013.01); *B60K 11/02* (2013.01); *B60K 11/04* (2013.01); *F01P 5/06* (2013.01); *F01P 11/10* (2013.01)

(58) Field of Classification Search
CPC ......... B60K 11/08; B60K 11/02; B60K 11/04; B60K 11/06; B60K 11/085; F01P 5/06; F01P 11/10
See application file for complete search history.

(56) References Cited

U.S. PATENT DOCUMENTS 4,730,664 A * 3/1988 Forsthuber ................ F01P 9/04
165/41
2004/0188061 A1* 9/2004 Beck ...................... B60K 11/04
165/149

(Continued)

FOREIGN PATENT DOCUMENTS

DE    102006060085 A1    6/2007
FR        3013302 A1    5/2015

OTHER PUBLICATIONS

International Search Report and Written Opinion in corresponding International Application No. PCT/FR2020/052303, dated Mar. 18, 2021 (11 pages).

(Continued)

*Primary Examiner* — Jacob M Amick
(74) *Attorney, Agent, or Firm* — Osha Bergman Watanabe & Burton LLP

(57) ABSTRACT

The present invention relates to a cooling module (100) for a motor vehicle, comprising at least one heat exchanger (3, 4) and at least one duct (1) comprising an air inlet (10) of the cooling module (100), the duct (1) being configured to convey cooling air from the air inlet (10) towards the heat exchanger (3, 4), characterized in that the duct (1) comprises fastening elements (24, 24', 25, 26, 27, 29) configured to fasten the heat exchanger (3, 4) to the duct (1).

7 Claims, 10 Drawing Sheets

Figure 1:
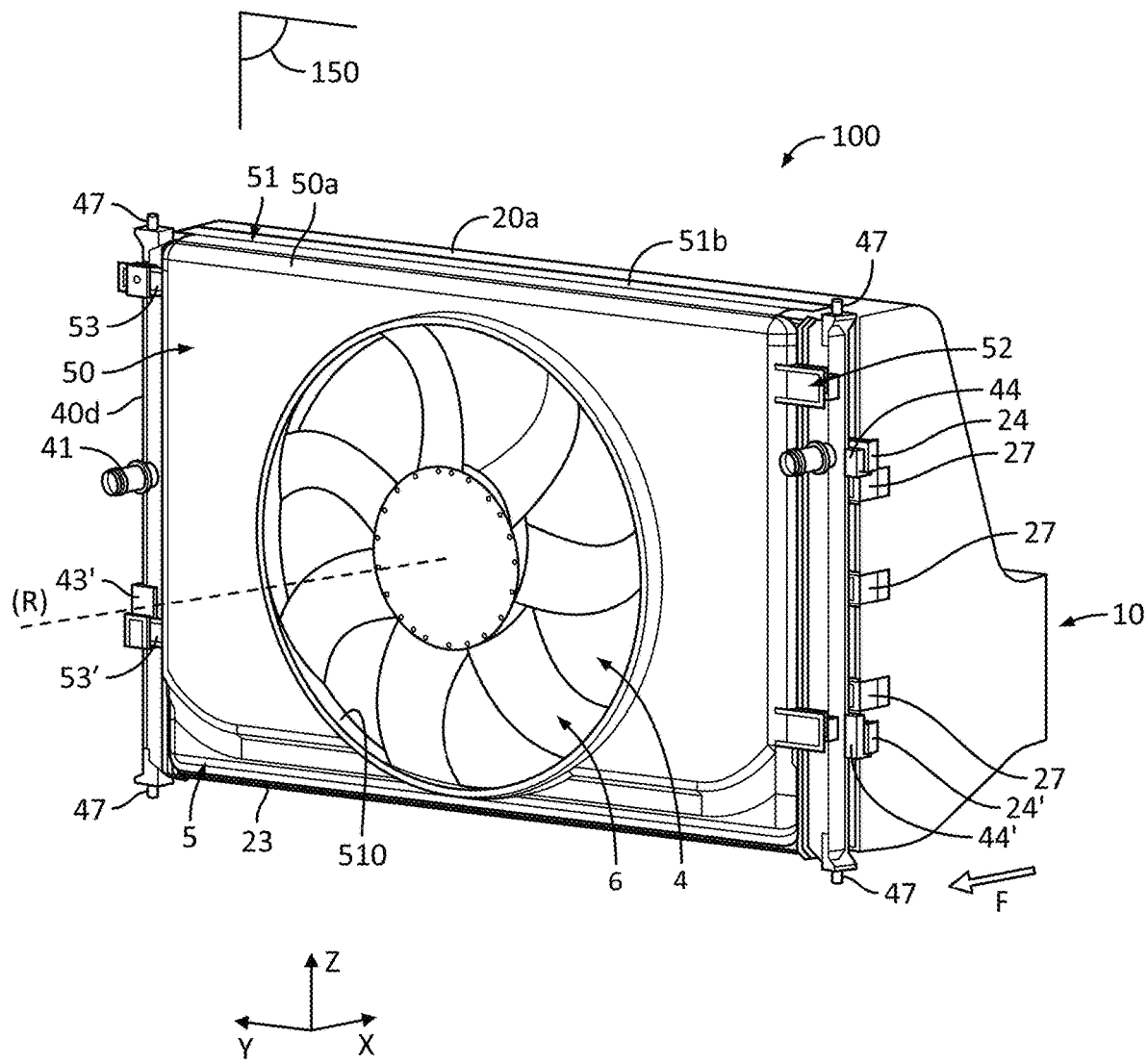

(51) Int. Cl.
*B60K 11/04* (2006.01)
*F01P 5/06* (2006.01)
*F01P 11/10* (2006.01)

(56) References Cited

U.S. PATENT DOCUMENTS

| | | | |
|---|---|---|---|
| 2011/0219762 A1* | 9/2011 | Kobayashi | E02F 9/00 |
| | | | 60/456 |
| 2012/0241128 A1* | 9/2012 | Vacca | B60K 11/085 |
| | | | 165/44 |
| 2018/0327038 A1 | 11/2018 | Battaglini et al. | |

OTHER PUBLICATIONS

French Search Report in corresponding French Application No. 1914376, dated Dec. 13, 2019 (7 pages).

* cited by examiner

COOLING MODULE FOR A MOTOR VEHICLE

The invention relates to the field of cooling modules for motor vehicles.

Such cooling modules may notably be positioned on the front face of a motor vehicle, for example at a radiator grille of such a vehicle and generally comprise an area inlet duct, a set of heat exchangers, a support frame supporting these exchangers, and a motorized fan, the role of which is to convey the cooling air (for example air collected directly from outside the vehicle through a front radiator grille of said vehicle) toward the heat exchangers of the cooling module. The heat exchangers are stacked so that they can be housed and fixed in an interior volume delimited by the support frame, which means to say, in other words, that this frame surrounds the exchangers that it supports. Furthermore, the support frame comprises retention means for mechanically holding the air inlet duct and the motorized fan facing the heat exchangers so as to guide the air entering the cooling module through the heat exchangers ensuring that a maximum of the air flow is conveyed, with a minimum of losses, toward said exchangers. In practice, the retention means are connected to the support frame, in order to limit costs.

The technical problem to which the invention proposes to provide a solution is that of the cooling-air losses which may occur, in particular, between the edges of the air inlet duct and the frame which retains same, one same time simplifying the management of the sealing between the various components of the cooling module.

The present invention proposes a cooling module for a motor vehicle, comprises at least one heat exchanger and at least one duct comprising an air inlet of the cooling module, the duct being configured to convey cooling air from the air inlet toward the heat exchanger, characterized in that the duct comprises fixing elements configured for fixing the heat exchanger to the duct.

The configuration proposed by the invention makes it possible to reduce the number of components to be assembled to form a cooling module, thereby facilitating assembly and reducing the production costs associated with such a cooling module. Limiting the number of components also makes it possible to improve the reliability of such a cooling module by limiting the vibrations at the component joints, and also makes it possible to reduce the consumption of the vehicle by reducing the weight of the cooling module.

According to one optional feature of the invention, the cooling module may comprise two heat exchangers and the duct comprises first fixing elements configured for fixing a first heat exchanger to the duct, and second fixing elements configured for fixing a second heat exchanger to the duct.

According to one optional feature of the invention, the duct comprises an air outlet, extending in a plane parallel to a plane of extension of the cooling module, and a covering wall bordering the air outlet and defined by a plurality of panels extending perpendicular to the plane of extension.

According to various optional features of the invention, provision may be made for the air outlet to be configured so that the cooling air arrives on an inlet face of the heat exchanger, and/or for the air outlet of the duct to face the inlet face of the heat exchanger, and/or alternatively for the duct to comprise a connecting wall connecting the air inlet of the cooling module to the air outlet of the duct.

According to one optional feature of the invention, the first fixing elements are arranged projecting from an internal face of the duct so as to house the first heat exchanger in a housing defined at least in part by the covering wall of the duct.

The at least one heat exchanger, in this instance the first heat exchanger, is thus inserted into the volume defined by the duct so that air leaks at the joins between the two components that are the heat exchanger and the duct are reduced. Thus, management of the sealing of such a cooling module is both simplified and improved.

According to one optional feature of the invention, the air outlet is delimited by a contour, the covering wall extending from the contour.

According to one optional feature of the invention, the covering wall comprises at least two opposing lateral panels arranged one on each side of the air outlet, first fixing elements being distributed over the first lateral panel and over the second lateral panel.

According to one optional feature of the invention, the covering wall is configured to longitudinally cover each edge of the first heat exchanger.

According to one optional feature of the invention, the second fixing elements are arranged projecting from an external face of the duct so as to position the second heat exchanger facing the first heat exchanger, on the outside of said housing. Thus, it will be appreciated that the duct is configured to bear the two heat exchangers, but that only the first heat exchanger is covered by the duct and the covering wall thereof, the other exchanger being arranged at least partially on the outside of the volume defined by the duct.

According to one optional feature of the invention, the fixing elements arranged on the internal face of the duct may consist of fixing means that operate by clip-fastening or by elastic deformation, whereas the fixing elements arranged on the external face of the duct may consist at least in part of fixing means that require tooling, for example that require screwing.

According to one optional feature of the invention, one panel of the covering wall may be extended by an edge that covers the second heat exchanger.

According to one optional feature of the invention, the second heat exchanger comprises fixing members configured for fixing the cooling module to the motor vehicle.

According to one optional feature of the invention, the heat exchanger is a condenser and/or a radiator. More particularly, the first heat exchanger is a condenser and the second heat exchanger is a radiator. The reverse being possible in the case of electric vehicles.

According to one optional feature of the invention, the cooling module comprises a ventilation member configured to force the cooling air to enter the cooling module.

According to one optional feature of the invention, the ventilation member comprises a covering lip configured to at least partially cover part of the covering wall.

According to one optional feature of the invention, the ventilation member is rendered indissociable from the duct and/or from the at least one heat exchanger. The ventilation member may comprise locking members and/or retaining members configured to allow it to be fixed to the exchanger and/or to the duct.

According to one optional feature of the invention, the ventilation member is a motorized engine fan.

According to one optional feature of the invention, the heat exchanger and the ventilation member are arranged along a longitudinal axis of the cooling module, the longitudinal axis corresponding substantially to the main direction of circulation of the flow of cooling air along the duct.

According to an optional feature of the invention, the fixing elements are formed as one with the duct. The duct, the covering wall and the fixing elements thus form a one-piece assembly, which is to say an assembly of which the various parts cannot be dissociated from one another without breaking the assembly.

According to one optional feature of the invention, the duct contains a polymer selected from the group comprising a polyamide, a polypropylene, a polyethylene terephthalate, a polyetherimide, and mixtures thereof.

According to one optional feature of the invention, the polyetherimide is an amorphous thermoplastic polyetherimide.

According to one optional feature of the invention, the duct contains at least one fiber selected from the group comprising carbon fiber, glass fiber, aramid fiber and mixtures thereof.

According to one optional feature of the invention, the aramid fiber is poly(p-phenylene phthalamide), also commonly known as Kevlar.

According to one optional feature of the invention, the fiber is overmolded with the polymer.

The invention also relates to a method for assembling a motor vehicle cooling module having one or more of the above features. The method comprises a step of obtaining the cooling module by assembling the duct with the heat exchanger. The method may comprise a step of assembling the ventilation member with the duct and/or with the heat exchanger.

According to one optional feature of the invention, with the heat exchanger being a condenser comprising a storage reservoir, the assembling of the heat exchanger comprises a step of inserting the storage reservoir into one part of the fixing elements, and a subsequent step of locking the exchanger to the duct.

According to various optional features of the invention, the insertion of the reservoir may be performed at more than 15° with respect to the plane of extension of the cooling module. Further, the locking step may be performed by pivoting about an axis formed by the fixing elements into which the storage reservoir is inserted.

Figure 2:
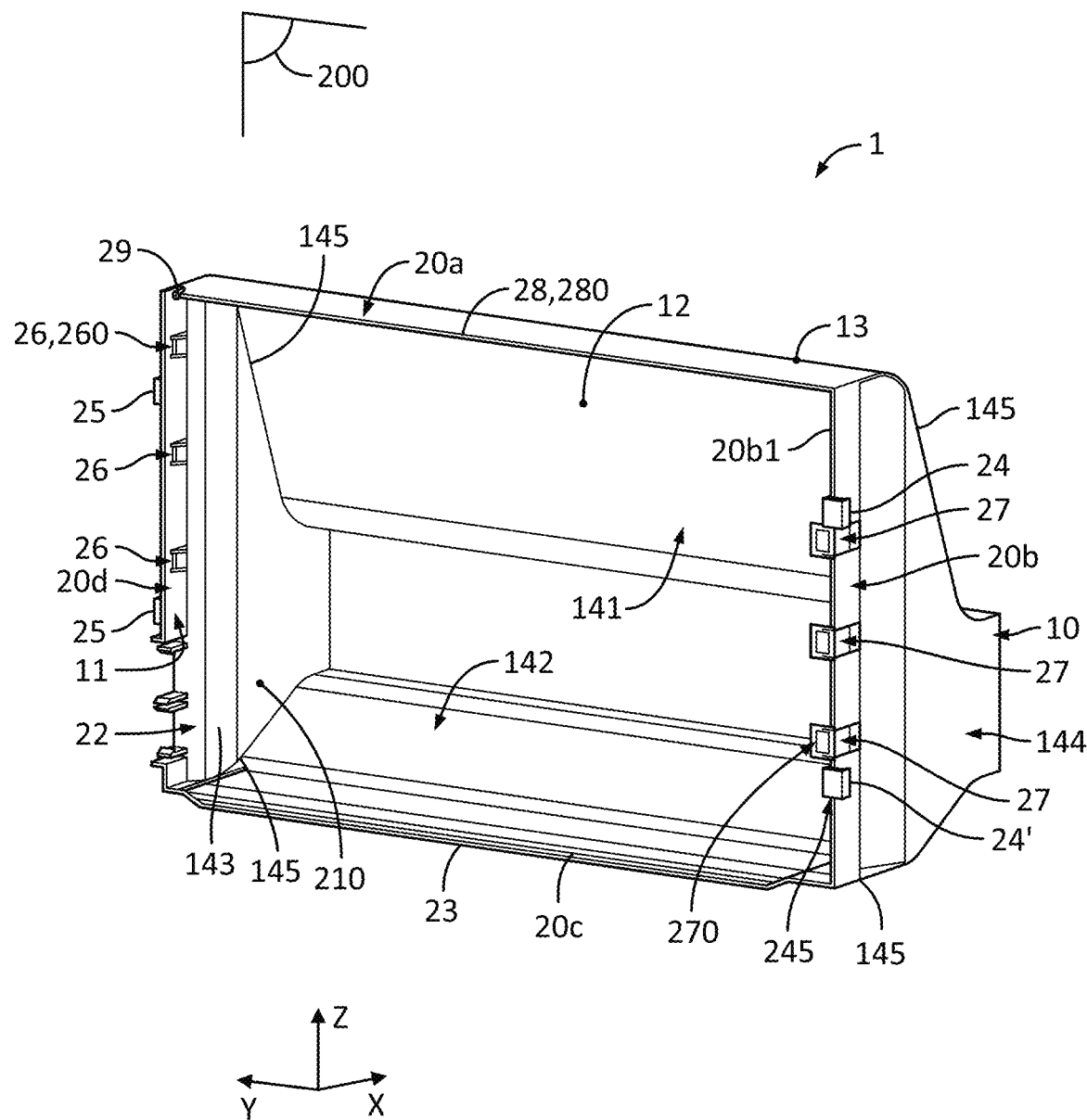
Figure 3:
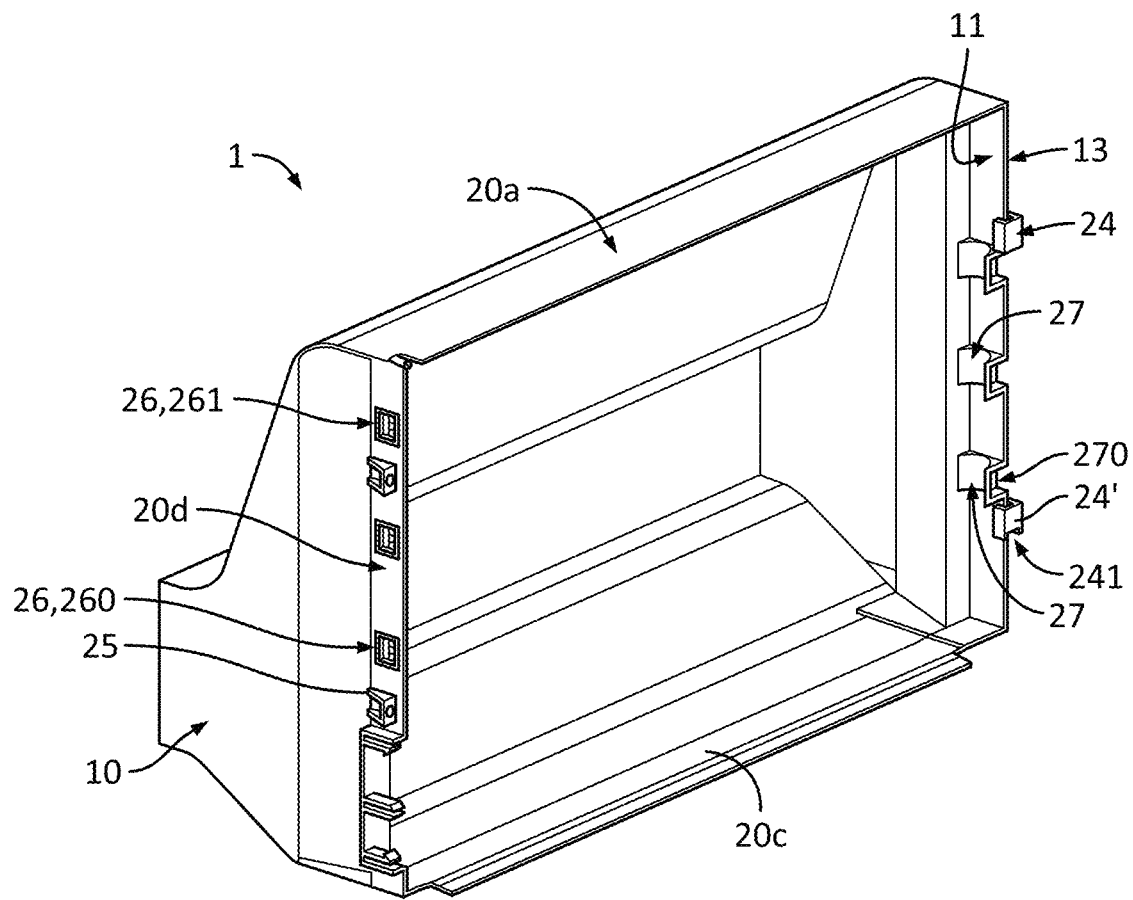
Figure 4:
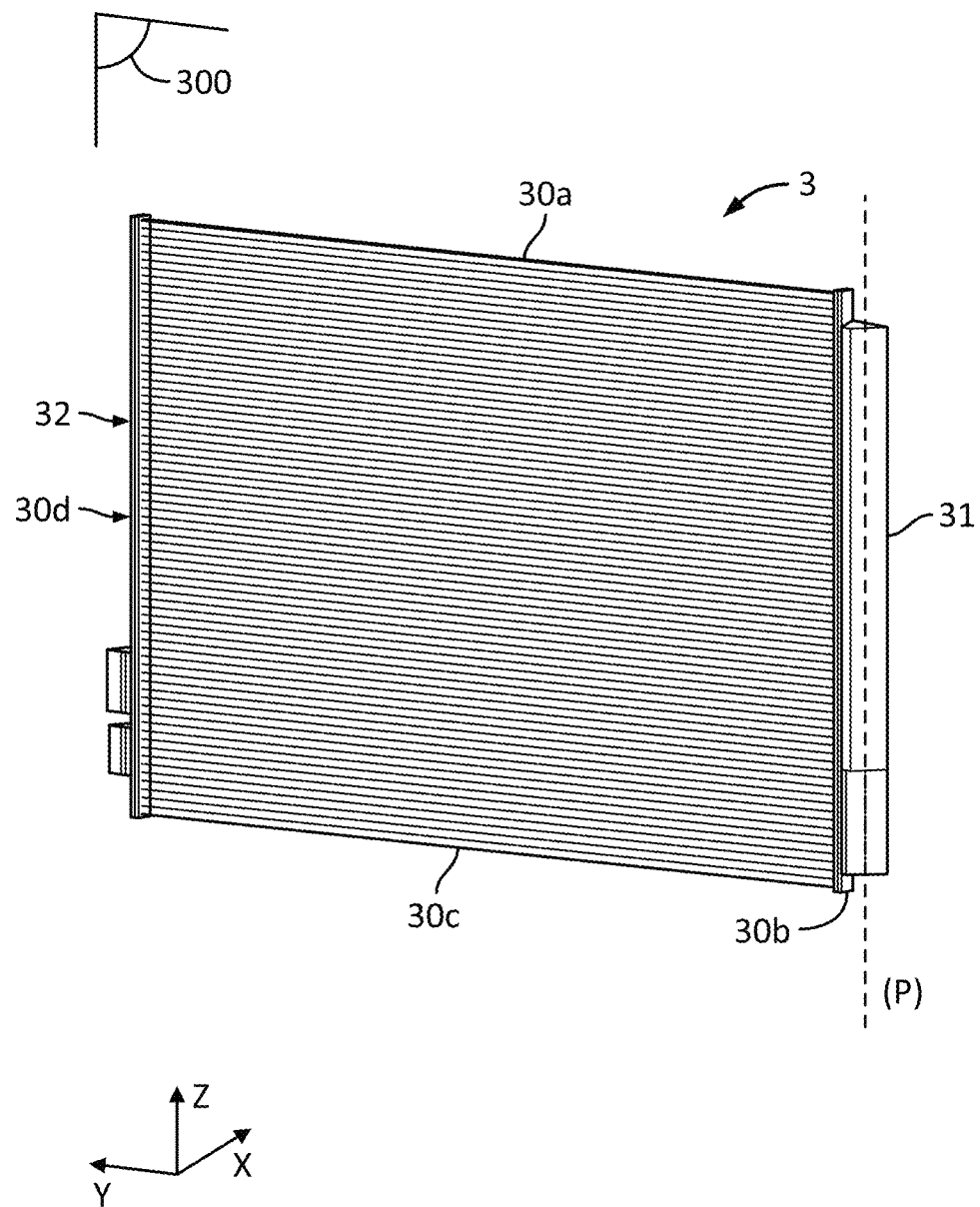
Figure 5:
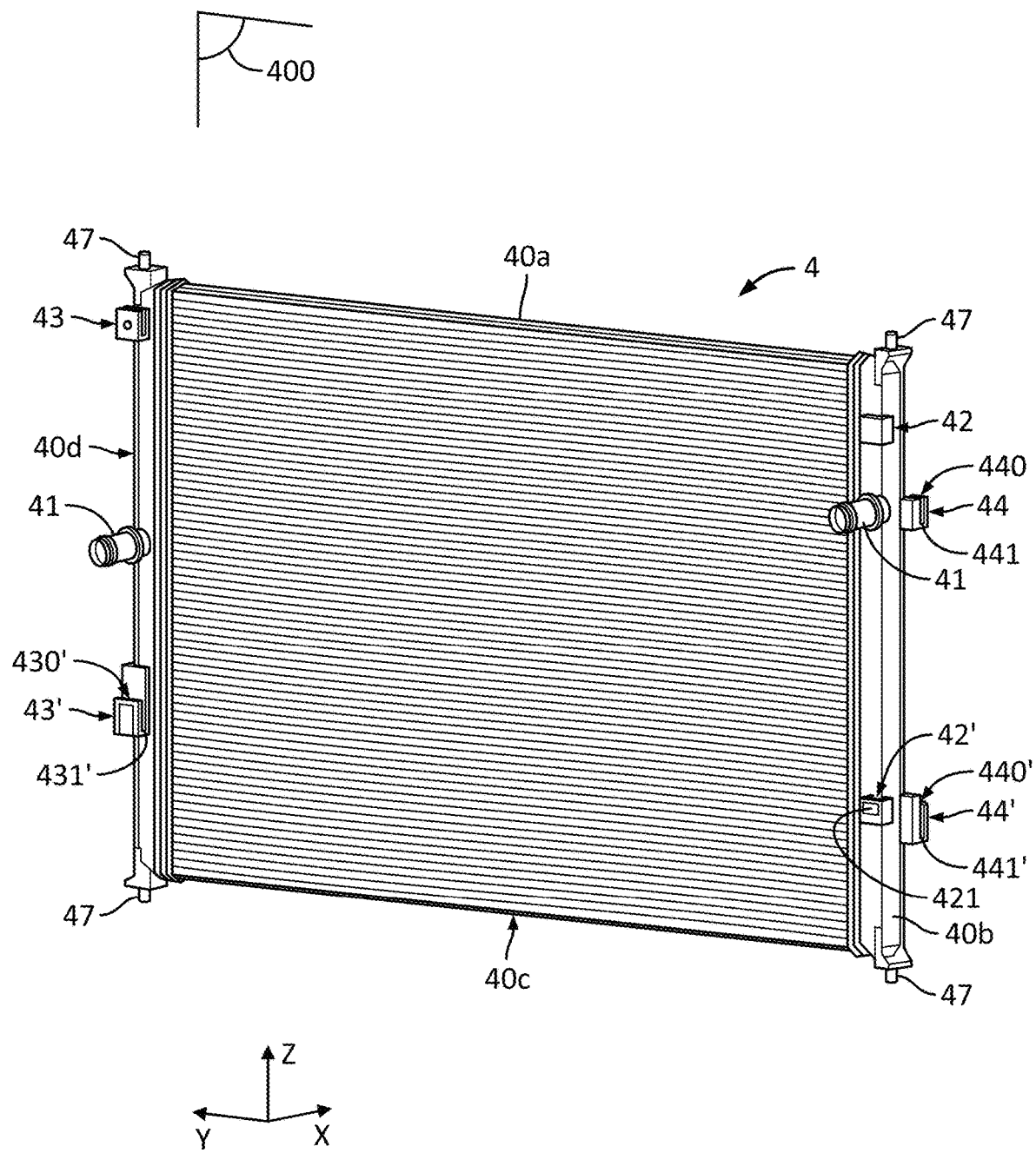
Figure 6:
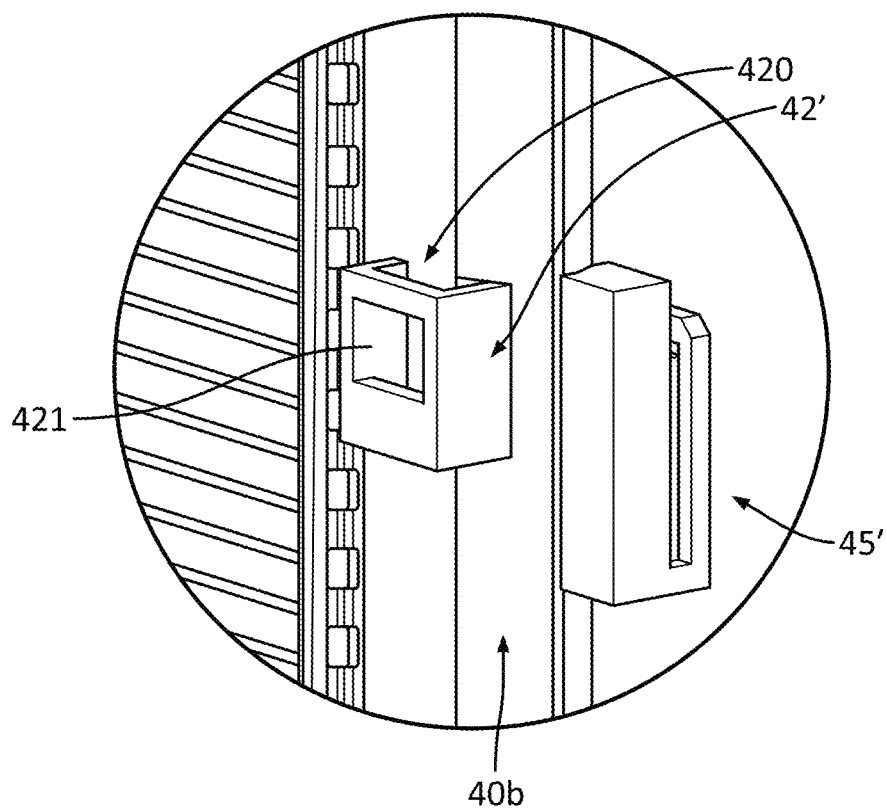
Figure 7:
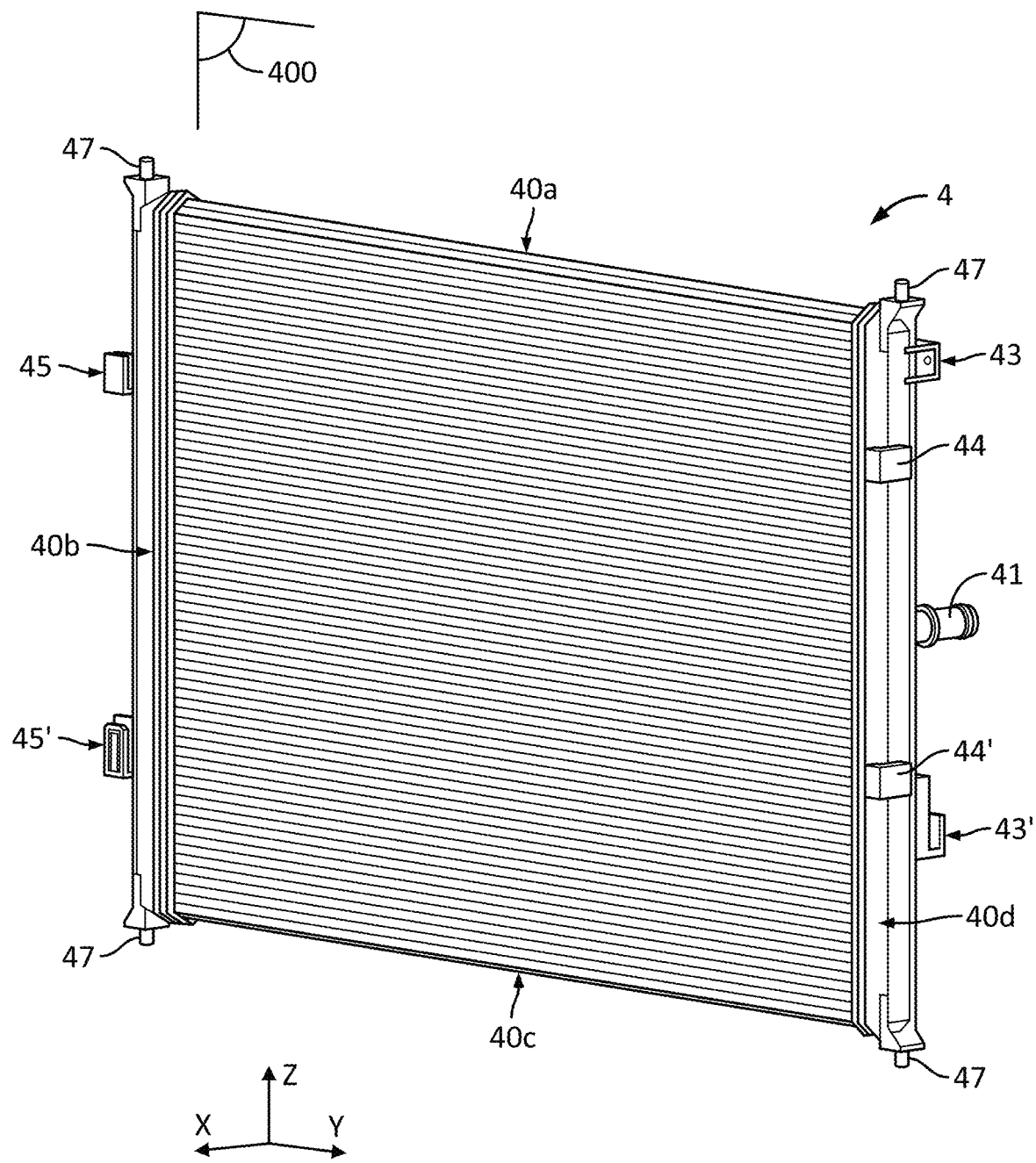
Figure 8:
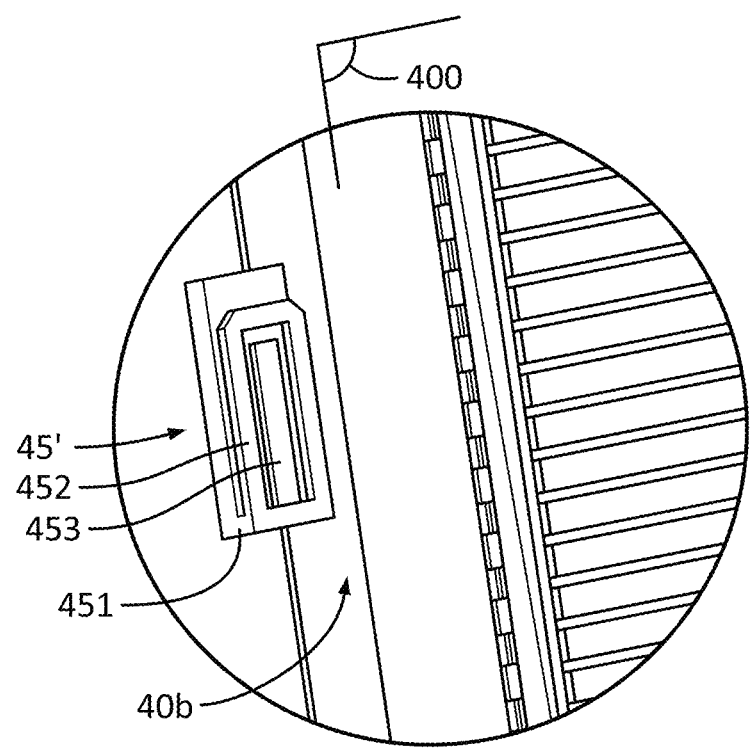
Figure 9:
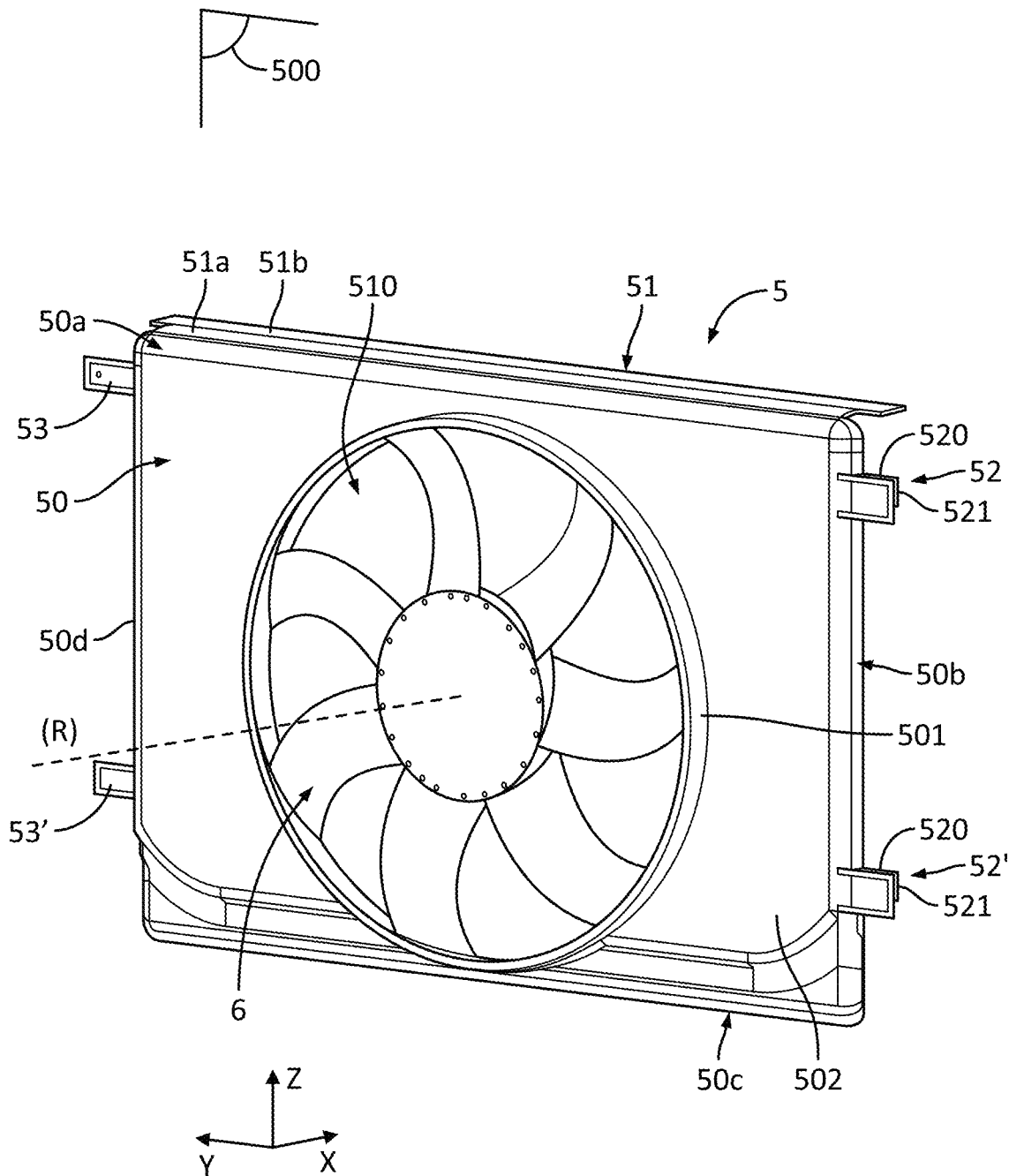
Figure 10:
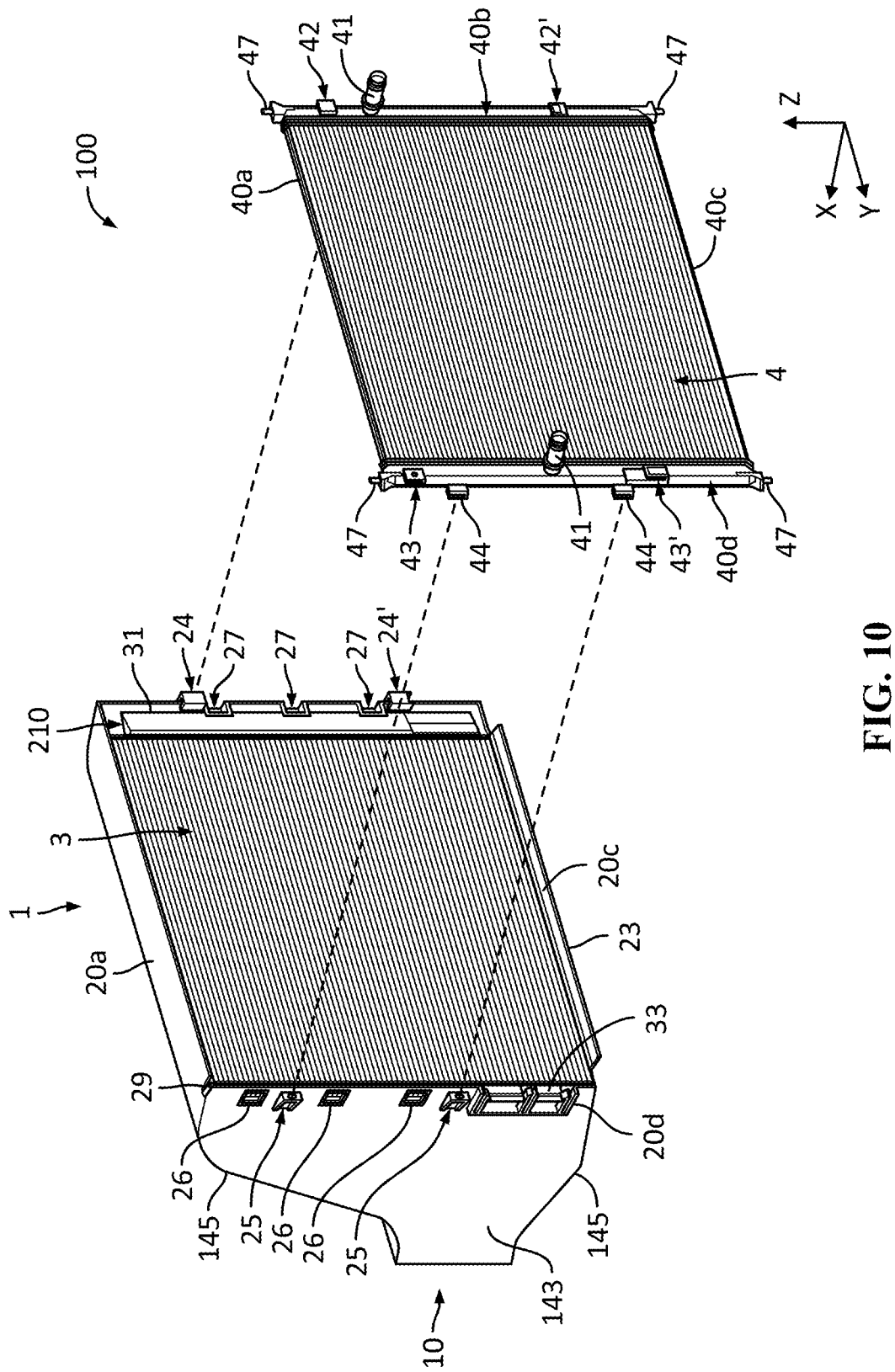

Other features and advantages of the invention will become even more apparent, on the one hand, from the following description and, on the other hand, from a plurality of non-limiting exemplary embodiments that are given by way of indication with reference to the attached schematic drawings, in which:

FIG. 1 is a schematic perspective view of a cooling module according to the invention, FIG. 2 is a schematic perspective view of a duct of the cooling module as illustrated in FIG. 1, FIG. 3 is a schematic view of the duct of FIG. 2, from a different perspective, FIG. 4 is a schematic perspective view of a first heat exchanger of the cooling module as illustrated in FIG. 1, FIG. 5 is a schematic perspective view of a second heat exchanger of the cooling module as illustrated in FIG. 1, viewed from a first perspective, FIG. 6 is a view of detail of FIG. 5, more particularly illustrating a locking element of the second heat exchanger, FIG. 7 is a schematic perspective view of the second heat exchanger of the cooling module as illustrated in FIG. 5, viewed from a different perspective from that of FIG. 5, FIG. 8 is a view of detail of FIG. 7, more particularly illustrating a hook used for fixing the second heat exchanger, FIG. 9 is a schematic perspective view of a ventilation member of the cooling module as illustrated in FIG. 1, FIG. 10 schematically illustrates the assembly of certain components of the cooling module as illustrated in FIG. 1.

It should first of all be noted that although the figures set out the invention in detail for implementing the invention, said figures may be used in order better to define the invention if necessary. It should also be noted that, in all of the figures, elements that are similar and/or perform the same function are indicated using the same numbering.

In the following description, a longitudinal, vertical and transverse orientation adopted will, in a nonlimiting manner, be that according to the orientation traditionally used in the automobile industry. Furthermore, the terms "lower", "upper", "top", "bottom", "vertical" and "horizontal" should be interpreted when the object is in the normal position of use on the vehicle. A direction of a longitudinal axis X, a direction of a transverse axis Y, and a direction of a vertical axis Z are depicted by a trihedron (X, Y, Z) in the figures. A horizontal plane is defined as being a plane perpendicular to the vertical axis, a longitudinal plane is defined as being a plane perpendicular to the transverse axis, and a transverse plane is defined as being a plane perpendicular to the longitudinal axis.

A cooling module 100 according to the invention, for example intended to be placed on the front face of a motor vehicle, comprises a duct 1 in which at least one heat exchanger 3, 4 is housed, the cooling module 100 also comprising a ventilation member 5 acting as a closure device for said cooling module 100.

According to the invention, and as will be detailed hereinafter, the duct 1 comprises fixing elements for fixing the at least one heat exchanger 3, 4 so that the duct performs both a function of guiding the air as it enters the cooling module and a structural function of supporting the heat exchanger concerned.

More particularly, the duct may accept a first heat exchanger 3 and a second heat exchanger 4 arranged one after the other in the longitudinal direction X, and the duct comprises fixing elements for fixing each of these exchangers.

The above-defined trihedron (X, Y, Z), the directions of which respectively embody the thickness, the width and the height of the cooling module 100 according to the invention and of the duct 1 that it comprises, can be found in this FIG. 1.

In the cooling module 100, the duct 1 is configured to convey cooling air, for example collected from outside the motor vehicle equipped with the cooling module 100, for example at a front radiator grille of such a vehicle, successively to the first heat exchanger 3 and then to the second heat exchanger 4. To optimize the circulation of the cooling air through the first heat exchanger 3 and the second heat exchanger 4, particularly when the vehicle is running at a low speed or is stationary, the ventilation member 5 is pierced with a cutout 510 in which there is housed a motorized fan 6 rotationally driven about an axis of rotation R by a drive motor not visible in FIG. 1.

In the cooling module 100 illustrated here, the rotation of the motorized fan 6 is performed in such a way that it causes cooling air to be drawn by suction through the heat exchangers 3, 4 in a direction indicated by the arrow F in FIG. 1. The suction generated by the rotation of the motorized fan 6 about its axis of rotation R contributes both to guiding the flow of cooling air through the cooling module 100, and to increasing the quantity of air passing therethrough.

FIGS. 1 and 2 more particularly illustrate the duct 1.

The duct 1 comprises a first longitudinal end 10 which is open to the outside of the cooling module so as to form an area inlet of the duct and of the cooling device 1, and a second longitudinal end 12 open onto the heat exchanger or exchangers so as to form an air outlet of the duct. In what follows, reference will be made to the front and the rear of the cooling module and of the duct, with respect to the direction in which the cooling air circulates from the area inlet, at the front of the duct, as far as the air outlet, at the rear of the duct.

The contour of the air inlet delimits a surface of the air inlet 10, and the contour of the air outlet 12 delimits a surface of the air outlet 12. As illustrated, the duct here has a flared shape, with the surface area of the air outlet 12 being greater than the area of the air inlet 10.

The contour of the air inlet 10 and the contour of the air outlet 12 each have a substantially rectangular overall shape when viewed in the transverse plane. More particularly, each contour has a long upper side and a long lower side extending along the transverse axis Y, and two short lateral sides extending along the vertical axis Z.

The duct 1 comprises an upper wall 141, a lower wall 142 and two lateral walls 143, 144. The four walls 141, 142, 143, 144 extend from the contour of the air inlet 10 as far as the contour of the air outlet 12 and two adjacent walls meet along corners 145.

The two lateral walls 143, 144 extend in the longitudinal plane, being planar and parallel to one another. The two lateral walls 143, 144 each connect a short side of the contour of the air inlet 10 to a short side of the air outlet 12.

The upper wall 141 connects the long upper side of the contour of the air inlet 10 to the long upper side of the contour of the air outlet 12, and the lower wall 142 connects the long lower side of the contour of the air inlet 10 to the long lower side of the contour of the air outlet 12. The upper wall 141 and the lower wall 142 each have the form of a curved plate which can be observed in the transverse plane, the curvatures of these plates being such that the upper wall and the lower wall diverge from one another in the direction toward the air outlet.

The duct 1 may be made from a polymer selected from the group comprising a polyamide, a polypropylene, a polyethylene terephthalate, a polyetherimide, and mixtures thereof. In one preferred embodiment, the polyetherimide is an amorphous thermoplastic polyetherimide. The duct may also contain at least one fiber selected from the group comprising carbon fiber, glass fiber, aramid fiber and mixtures thereof. In one preferred embodiment, the aramid fiber is poly(p-phenylene phthalamide), also commonly known as Kevlar. The fiber may be overmolded with a polymer as mentioned hereinabove.

The duct 1 further comprises a covering wall 2 which develops from the contour of the air outlet, extending longitudinally away from the air inlet of the duct. As illustrated, the covering wall 2 extends along the entire contour of the air outlet 12.

The overlapping wall 2 is formed of four substantially planar panels 20a, 20b, 20c, 20d, respectively, which together delimit a housing 210 to at least partially receive at least one of the heat exchangers 3, 4 which are not depicted in FIG. 2. More specifically, according to the example illustrated in the figures, the panels 20a, 20b, 20c, 20d together form a rectangular parallelepiped of which the main rectangular shape extends in the direction of a plane of covering 200, which, give or take the manufacturing tolerances, is substantially parallel to a main plane of extension 150 of the cooling module 100. The panels 20a, 20b, 20c, 20d exhibit the same dimension along the longitudinal axis X, namely in the thickness direction of the cooling module 100.

As shown in FIG. 2, the long sides of the aforementioned rectangular shape, which consist of the upper panel 20a and the lower panel 20c which is parallel to the upper panel 20a, extend mainly in the width direction of the cooling module 100, which is to say in the direction of the transverse axis Y, and the short sides of the aforementioned rectangular shape, which consist respectively of the lateral panels 20b and 20d, which are parallel to one another and perpendicular to the upper and lower panels 20a, 20c, extend chiefly in the height direction of the cooling module 100, which is to say in the direction of the vertical axis Z.

As FIG. 2 shows, the covering wall 2 comprises two stop lips 22 each of which develops in the plane of covering 200 as a projection from a lateral panel, extending from the upper panel 20a as far as the lower panel 20b along the vertical axis Z. The stop lips 22 form end stops when the first heat exchanger 3 is being introduced. The stop lips 22 also reduce the surface of the air outlet 12 so as to direct the cooling air specifically onto an exchange surface of the heat exchangers 3, 4 and the last prevent or at least impede the passage of cooling air between the panels 20a, 20b, 20c, 20d and the heat exchangers 3, 4.

As an alternative to what has been illustrated, stop lips may be arranged projecting from the upper panel and from the lower panel so as to form an interior barrier around the entire perimeter of the contour of the air outlet which then contributes to forming an integral sealing means aimed at impeding the loss of air between the sealing wall and the heat exchangers.

As can be seen in FIG. 2, the covering wall 2 comprises fixing elements for each of the two heat exchangers 3, 4. Among these fixing elements, it is possible to distinguish between first fixing elements which face toward the inside of the covering wall for fixing the first heat exchanger 3, and second elements which face toward the outside of the covering wall for fixing the second heat exchanger.

The first fixing elements notably comprise blocking elements 26, pivot elements 27, blocking members 28 and a retaining member 29. The first fixing elements 26, 27, 28, 29 extend from an internal face 11 of the duct, and more particularly an internal face of the corresponding panel of the covering wall 2, namely from a face that faces toward the inside of the duct. Each of these first fixing elements is configured to render the covering wall 2 and the second exchanger 4 mechanically indissociable.

The pivot elements 27, of which there are three here, are arranged at the first lateral panel 20b and are notably visible in FIG. 3. They each form a projection of the internal face of this lateral panel extending toward the inside of the housing 210. The three pivot elements 27 each adopt the form of a curved blade, substantially in the form of a semicircle, open onto the inside of the housing, to form a zone for receiving a lateral element of the first heat exchanger 3 which zone is configured to create a pivot connection of the first heat exchanger 3 to the duct. Each pivot element 27 has an elastically deformable tongue 270 the purpose of which is to block the position of the lateral element of the first heat exchanger in the curved blade.

The blocking elements 26, of which there are likewise three, are arranged on the opposite lateral panel, namely the second lateral panel 20d. These blocking elements 26 each take the form of an elastic leaf 260 extending at the center of an orifice 261 made in the second lateral panel 20d. More particularly, this elastic leaf has an original configuration whereby it projects from the internal face of the second lateral panel 20*d* in the direction of the inside of the housing 210, each elastic leaf being capable of retracting into the orifice 261 when the first heat exchanger is inserted into the housing 210, the elastic-return effect of the elastic leaves contributing to fixing the first heat exchanger 3 in the duct, by pushing the first heat exchanger against the pivot elements 27.

The blocking elements 28, of which there are likewise three, are arranged on the upper panel 20*a*. These blocking elements 28 each take the form of an elastic leaf 280 extending as a projection from the internal face of the upper panel 20*a* in the direction of the inside of the housing 210, each elastic leaf being capable of being compressed against the upper panel 20*a* when the first heat exchanger 3 is inserted into the housing 210, the elastic-return effect of the elastic leaves contributing to fixing the first heat exchanger 3 in the duct, by pushing this heat exchanger against the lower panel 20*b*.

The retaining member 29 is arranged on the upper panel 20*a*. The retaining member 29 takes the form of a blade which extends in the plane of the upper panel 20*a*, a free end of the blade comprising a stud which projects out from the internal face of the upper panel, toward the inside of the housing. The retaining member 29 contributes to holding the first heat exchanger 3 when the latter is arranged in the housing 210.

It should be noted that, according to the invention, the duct comprises a plurality of first fixing elements arranged toward the inside of the housing for fixing the first heat exchanger, and that the number and form of these first fixing elements can be modified without departing from the scope of the invention.

The second fixing elements 24, 24', 25 extend from an external face 13 of the duct, and more particularly an external face of the corresponding lateral panel, namely from a face that faces away from the opposite lateral panel. In other words, the second fixing elements extend toward the outside of the duct 1. Each of these second fixing elements is configured to render the covering wall 2 and the second exchanger 4 mechanically indissociable.

These second fixing elements here comprise fixing pieces 24, 24' which are arranged on one lateral panel, and retaining tabs 25, which are arranged on the opposite lateral panel.

In this instance, the fixing pieces 24, 24' are attached to an external face of a first lateral panel 20*b* near to a corner 20*b*1 of the covering wall at this first lateral panel 20*b*. The fixing pieces 24, 24' each consist of a pocket dimensioned to accept a hook indissociable from the second heat exchanger, each pocket being at least open on a lower side, facing toward the lower panel 20*a* of the covering wall 2.

According to the example illustrated in FIG. 2, a first fixing piece 24 is arranged, in the height direction of the cooling module 100 as embodied by the vertical axis Z, in the vicinity of the upper panel 20*a*, and a second fixing piece 24' is arranged, in this height direction of the cooling module, in the vicinity of the lower panel 20*c*. In this example, the second fixing piece 24' comprises a window 241 for the blocking of the second heat exchanger 4 with the housing 210, which window is formed in a wall of the fixing piece 24' that is arranged opposite to the air inlet. As will be described hereinafter, this window 241 permits the blocking of the second heat exchanger by collaborating with a clip-fastening finger formed on the above-mentioned hook.

The two retaining tabs 25 are arranged on the external face of a second lateral panel 20*d* of the covering wall 2 opposite to the aforementioned first lateral panel 20*b*. Each retaining tab 25 forms a projection from this lateral panel in a direction substantially parallel to that of the transverse axis Y and comprises a receiving orifice, for example an orifice for receiving a retaining screw which has not been depicted in FIG. 3.

As illustrated in FIGS. 2 and 3, the lower panel 20*c* is extended by an edge 23 in the thickness direction of the cooling module 100 and therefore toward the rear along the longitudinal axis X. The edge 23 extends the lower panel 20*c* in the horizontal plane and acts as a support and as a guide for fitting the heat exchanger 4. It is also able to limit the leaks of cooling air to the outside of the cooling module 100, between the two heat exchangers when these are mounted on the duct.

According to an embodiment which has not been depicted, the edge extends longitudinally toward the rear over enough distance to also serve as a support and as a guide for fitting the ventilation member 5.

The covering wall 2 is formed as one with the duct 1. In other words, the duct 1 and the covering wall 2, together with all the fixing elements it comprises, form one and the same single component and are therefore made from the same material or materials. This component can be obtained for example by molding or by injection molding. This component therefore differs from elements that are joined together by welding or bonding. It is thus notable that the heat exchangers are fixed directly to the component which also guides air through the cooling module.

FIG. 4 schematically illustrates, in perspective, the first heat exchanger 3 of a cooling module 100 like the one illustrated in FIG. 1. The above-defined trihedron (X, Y, Z), the directions of which respectively embody the thickness, the width and the height of the cooling module 100 according to the invention and of the first heat exchanger 3, can be found in this figure.

The first heat exchanger 3 here has the overall shape of a rectangular parallelepiped of which the largest rectangular shape extends substantially in a main plane of extension 300 of the first heat exchanger 3, which, give or take the manufacturing and assembly tolerances, is substantially parallel to the main plane of extension 150 of the cooling module 100.

The first heat exchanger 3 comprises a body delimited by four end faces 30*a*, 30*b*, 30*c*, 30*d*, respectively, of which pairs are substantially mutually parallel and of which pairs are substantially mutually perpendicular. More specifically, the first heat exchanger 3 comprises an upper end face 30*a* and a lower end face 30*c* which are substantially mutually parallel and which form the long sides of the body of the first heat exchanger 3, and it comprises two lateral end faces 30*b*, 30*d* which are substantially mutually parallel and perpendicular to the aforementioned upper 30*a* and lower 30*c* faces and which form the short sides of the body of the first heat exchanger 3.

As illustrated, the first heat exchanger 3 has a heat exchange surface, in this instance formed by a plurality of transverse tubes extending between two header chambers 32 formed one on each of the lateral end faces 30*b*, 30*d* across substantially the entirety of the dimension, in the direction of the vertical axis Z, of the first heat exchanger 3.

According to the example more particularly illustrated in FIG. 4, the first heat exchanger 3 operates as a condenser: here it comprises, arranged in the vicinity of one of its lateral interfaces 30*d*, a reservoir 31 for storing a refrigerant fluid which thus forms the aforementioned lateral element of the first heat exchanger, capable of collaborating with the pivot elements 27 of the covering wall. The storage reservoir 31 extends chiefly in the direction of the vertical axis Z of the trihedron (X, Y, Z) over substantially the entire height of the first heat exchanger 3 along the corresponding lateral end face.

Inside the cooling module 100, and with reference to FIG. 1, the first heat exchanger 3 is able to be engaged in the housing 210 defined by the duct 1, with each of its end faces being covered by the covering wall 2 of the duct 1. More particularly, in this assembled position in which the first heat exchanger 3 is assembled inside the volume defined by the duct and its covering wall, the upper end face 30a of the first heat exchanger 3 faces the upper panel 20a, the lower end face 30c of the first heat exchanger 3 faces the lower panel 20c, and the lateral end faces 30b, 30d face the lateral panels 20b and 20d of the covering wall 2.

The fitting of the first heat exchanger 3 into the duct 1 and the housing 210 thereof is performed for example by offering the heat exchanger 3 up to the housing 210 at an angle of inclination such that the storage reservoir 31 is offered up to the first lateral panel 20b of the covering wall. For example, the heat exchanger 3 and the main plane of extension 150 of the cooling module may therefore form an angle of 45°. The storage reservoir 31 is engaged in the pivot elements 27 arranged on the first lateral panel 20b of the covering wall 2. The collaboration between the shapes of the curved blades of the pivot elements and the circular cylindrical shape of the storage reservoir enable the creation of a pivot connection of which an axis of pivoting P corresponds to the vertical alignment of the pivot elements and of the storage reservoir 3.

In a second stage, the first heat exchanger 3 is pivoted about this axis of pivoting so that the header chamber 32 opposite to the storage reservoir 31 comes to face the second lateral panel 20d of the covering wall 2, deforming the elastic leaves 260 that form the blocking members 26. The return force of these elastic leaves tends to push the first heat exchanger toward the pivot elements, pressing the storage reservoir into these pivot elements 27 within which the elastically deformable tongues 270 are able to block the position of the first heat exchanger 3. The blocking members 26, deformed and returned elastically to their position, notably avoid any excursion of the first exchanger along the transverse axis Y. At the same time, the upper end face 30a of the heat exchanger becomes positioned facing the upper panel 20a, moving aside the stud of the retaining member 29, the elastic return force of the latter allowing the stud to revert to a position of blocking the first heat exchanger in a position facing the upper panel so as to prevent any excursion of the heat exchanger 3 along the longitudinal axis X. Finally, the elastic blades of the blocking members 28, once the first heat exchanger 3 is facing the upper panel 20a, tend to push the exchanger against the opposite lower panel and therefore to limit the excursion along the vertical axis Z. FIG. 10 notably illustrates the position of the first heat sink 3 in the housing 210 once it has been mounted therein.

FIGS. 5 to 7 provide a schematic perspective illustration of the second exchanger 4 of the cooling module 100, from two different perspectives. More specifically, FIG. 5 illustrates the second heat exchanger 4 viewed from the side of the ventilation member 5 in a cooling module 100 like the one illustrated in FIG. 1, and FIG. 7 illustrates the second heat exchanger 4 viewed from the side of the air inlet 10 of such a cooling module 100. In other words, FIG. 4 shows the rear of the second heat exchanger 4 and FIG. 6 shows the front of the second heat exchanger 4 with reference to the longitudinal orientations described hereinabove. The above-defined trihedron (X, Y, Z), the axes of which respectively embody the thickness, the width and the height of the cooling module 100 and of the second heat exchanger 4 can be found in these figures.

With reference to FIGS. 5 and 7, the second heat exchanger 4 takes the overall form of a rectangular parallelepiped of which the largest sized rectangular shape extends in a main plane of extension 400 of the second heat exchanger 4. In the cooling module 100 according to the invention, the main plane of extension 400 of the second heat exchanger 4 is substantially parallel, give or take the manufacturing and assembly tolerances, to the main plane of extension 150 of the cooling module 100.

The second heat exchanger 4 comprises a body delimited by four edge-pieces 40a, 40b, 40c, 40d, respectively, of which pairs are substantially mutually parallel and of which pairs are substantially mutually perpendicular. More specifically, the second heat exchanger 4 comprises an upper edge-piece 40a and a lower edge-piece 40c which are substantially mutually parallel and form the long sides of the body, as well as two lateral edge-pieces 40b, 40d which are substantially mutually parallel and perpendicular to the aforementioned upper edge-piece 40a and to the aforementioned lower edge-piece 40c, and which form the short sides of the body.

In the cooling module 100, and also with reference to FIG. 1, the upper edge-piece 40a of the second heat exchanger 4 is engaged in the housing 210 delimited by the covering wall 2 in the vicinity of the upper panel 20a thereof. It then follows that the lower edge-piece 40c of the second heat exchanger 4 is housed, in this housing, in the vicinity of the lower panel 20c, the lateral edge-pieces 40b and 40d being arranged in the vicinity of the lateral panels 20b and 20d of the covering wall 2.

As illustrated, the second heat exchanger 4 has a heat exchange surface, in this instance formed by a plurality of transverse tubes extending between two header chambers 41 formed one on each of the lateral edge-pieces 40b, 40d across substantially the entirety of the dimension, in the direction of the vertical axis Z, of the second heat exchanger 4. The latter further comprises two end pieces 410, fluidically connected to a respective one of the header chambers, which allow the cooling fluid to enter and to leave the second heat exchanger 4. The second heat exchanger 4 here works as a radiator, with cooling fluid circulating from one header chamber to the other, these chambers being positioned laterally with respect to the body of the second heat exchanger and being respectively connected to a cooling fluid circulation circuit via the end pieces 41. Each end piece here extends substantially perpendicular to the main plane of extension 400 of the second heat exchanger 4, and on the one same side of the latter parallel to the longitudinal axis X. More specifically, and with reference also to FIG. 1, the end pieces 41 extend, in the cooling module 100, in the direction of the ventilation member 5.

The second heat exchanger 4 comprises two locking elements, a first locking element 42 and a second locking element 42', which are configured to render the second heat exchanger 4 mechanically indissociable from the ventilation member 5 of the cooling module 100.

With reference to FIG. 5, the locking elements 42, 42' are arranged starting from a first lateral edge-piece 40b of the second heat exchanger 4, and more specifically, projecting toward the rear from the aforementioned lateral edge-piece 40b, so as to be able to collaborate with the ventilation member 5. As shown in FIGS. 5 and 7, a first locking element 42 is arranged, in the direction of the vertical axis Z, in the vicinity of the upper edge-piece 40a of the second heat exchanger 4, and a second locking element 42' is arranged, in the direction of the vertical axis Z, in the vicinity of the lower edge-piece 40c of the second heat exchanger 4.

Each locking element 42, 42' delimits, with the lateral edge-piece 40b from which it extends, a sheath 420 passing along the vertical axis Z. More specifically, the sheath of each locking element is open in the direction of the upper edge-piece 40a of the second heat exchanger 4. The second locking element 42' comprises a blocking window 421 arranged in a wall of the first locking element 42 that faces toward the rear of the cooling module 100, which is to say which faces toward the ventilation member 5, as is notably visible in the detail that is FIG. 6.

The shapes and dimensions of the sheaths 420 respectively of the first locking element 42 and of the second locking element 42', are defined in such a way as to allow complementary means borne by the ventilation member 5, in this instance staples 521 as visible in FIG. 9 in particular, to engage in them. It will be appreciated that the shape and the dimensions of a staple 521 of the ventilation member 5, intended to be engaged in the sheath 420 of the second locking element 42', are defined in such a way that once this engagement has been performed, a part of the aforementioned staple 521 collaborates with the blocking window 421, for example by clip-fastening, to block the ventilation member 5 and the second heat exchanger 4 together in the direction of the vertical axis Z.

Moreover, the second heat exchanger 4 comprises, arranged starting from the rear of its second lateral edge-piece 40d opposite to the first lateral edge-piece 40b, a securing tab 43, which forms a projection from this second lateral edge-piece toward the rear of the second heat exchanger 4. In this example, the securing tab 43 comprises an orifice designed to receive, substantially perpendicular to the main plane of extension 400 of the second exchanger 4, a means for mechanically securing the second heat exchanger 4 to the ventilation member 5 and, for example, a binding screw.

The second heat exchanger 4 also comprises, on this second lateral edge-piece 40d, a support element 43' which projects out toward the rear of the second heat exchanger 4 in the direction of the longitudinal axis X. In this embodiment, the support element 43' has the shape of a U open at the top, which is to say with an opening facing toward the upper edge-piece 40a, and thereby delimiting an accommodating housing 430', closed by an end-stop wall 431' which forms the base of the U and which extends substantially perpendicular to the main plane of extension 400 of the second heat exchanger 4. This support element is intended to accept a tab belonging to the ventilation member to ensure the position thereof and to hold it in position with respect to the second heat exchanger before it is fixed using the securing tab 43 and the associated securing means.

FIG. 7 shows the second heat exchanger 4 viewed from the side of the air inlet 10 of the cooling module 100 according to the invention, which is to say viewed from the side via which the second heat exchanger 4 is partially received in the housing 210 defined by the covering wall 2 of the cooling module 100.

With reference to this FIG. 7, and to FIG. 5, the second heat exchanger 4 comprises two fixing end stops 44 arranged starting from the second lateral edge-piece 40d. These fixing end stops 44 are arranged respectively in the vicinity of the upper edge-piece 40a and of the lower edge-piece 40c of the second heat exchanger 4 and each extend out from the second lateral edge-piece toward the front of the cooling module, namely toward the duct and the first heat exchanger 3. In the cooling module 100 according to the invention, and with reference also to FIG. 1, the above-mentioned fixing end stops 44 are configured to collaborate with the retaining tabs 25 arranged on the outside of the second lateral panel 20d of the covering wall 2, so as to contribute to the fixing of the second heat exchanger 4 on the duct 1.

To complement this, and as shown more particularly in FIGS. 7 and 8, the second heat exchanger 4 also comprises two hooks 45, 45' which are arranged on the second lateral edge-piece 40b, so as to form a transverse projection with the hook which is open toward the front of the cooling module 100. More specifically, a first hook 45 is arranged, in the direction of the vertical axis Z, in the vicinity of the upper edge-piece 40a of the second heat exchanger 4, and a second hook 45' is arranged, in the direction of this vertical axis Z, in the vicinity of the lower edge-piece 40c of the second heat exchanger 4. Each hook 45, 45' has a base wall 450 which transversely extends the second lateral edge-piece 40b, a return wall 451 which extends perpendicular to this base wall and perpendicular to the main plane of extension 400 of the second heat exchanger 4, and a fixing wall 452, which extends the return wall at right angles toward the upper edge 40a of the second heat exchanger 4 and which extends parallel to the main plane of extension 400 of the second heat exchanger 4, thereby forming a slot between the base wall 450 and the fixing wall 452. The fixing wall 452 of the second hook 45' comprises an elastic fixing finger 453 able to collaborate with the blocking window 241 of the second fixing piece 24'.

According to the invention, the hooks 45, 45' are configured to be engaged in the pockets of the fixing pieces 24, 24' arranged on the covering wall 2 of the duct 1 of the cooling module 100. More specifically, a result of the foregoing is that such engagement is achieved, in the cooling module 100 according to the invention, in a direction substantially parallel to the main plane of extension 150 of said module and, more specifically still, in a direction parallel to the height of said module, as embodied by the direction of the vertical axis Z. Advantageously, the bottom wall lies in the blocking window 241 for positioning the hook and the second heat exchanger 4 with respect to the duct 1. The shape and dimensions of the hooks 45, 45' are defined in such a way that once this engagement has been achieved, part of the second hook 45', namely the finger 453, collaborates with the upper edge of the second fixing piece 24' to block the second heat exchanger 4 and the duct 1 together by clip-fastening in the direction of the aforementioned vertical axis Z.

With reference to FIGS. 5 and 7, the second heat exchanger 4 comprises fixing members 47. They allow the cooling module 100 to be positioned and secured in a vehicle. The fixing members 47 are arranged to project vertically from the body of the exchanger 4, in the direction of the vertical axis Z, from the ends of the lateral edges toward the outside of the cooling module 100.

It is notable according to the invention that the duct 1 is rendered directly indissociable from each of the two heat exchangers, so as to form a cooling module having a minimal number of component parts, and so that it is the second heat exchanger 4, in this instance a radiator, which consists of the heaviest component part of this cooling module, that is used for fixing the module to the vehicle.

As illustrated in FIG. 10, the assembling of the second heat exchanger 4 with the duct 1 is performed after the first heat exchanger 3 has been mounted in the housing 210 of the duct 1. Assembly is performed both by engaging, in a direction parallel to that of the main plane of extension 150 of the cooling module, the hooks 45, 45' of the second heat exchanger 4 with the fixing pieces 24, 24' of the covering wall 2, and by securing this engagement, in a direction perpendicular to the aforementioned main plane of extension 150, for example using a screw inserted both into the retaining tabs 25 of the covering wall 2 and into the fixing end stops 44 of the second heat exchanger 4. The edge 23 guides the second heat exchanger 4 as it is being fitted. A result of the foregoing is therefore that, in the cooling module 100 according to the invention, the second heat exchanger 4 is fixed to the duct 1, facing the first heat exchanger 3 so as to be superposed with this first heat exchanger 3 along the longitudinal axis X. More specifically, the first heat exchanger 3 is positioned in the housing 210, surrounded on its periphery, with the exception of a region of connecting flanges 33, by the covering wall 2, whereas the second heat exchanger 4 is positioned outside of this housing, but held by the second fixing elements, which are indissociable from the duct 1 and arranged on the external faces of the covering wall.

FIG. 9 is a schematic perspective view of the ventilation member 5 of a cooling module 100 like the one illustrated in FIG. 1. The trihedron (X, Y, Z) and the cutout 510 arranged in the ventilation member 5 and the motorized fan 6 housed in the aforementioned cutout 510 can be found in this figure. This figure provides a more visible depiction of a ring 501 projecting from a rear face 502 of the ventilation member 5, the rear face 502 facing away from the duct 1. This ring 501 forms a housing for the motorized fan 6 so that it is not in contact with the second heat exchanger 4, which is the one closest to the ventilation member 5.

The ventilation member 5 more particularly comprises a substantially planar partition 50 extending in a main plane of extension 500 of the ventilation member which is substantially parallel, give or take the manufacturing tolerances, to the main plane of extension 150 of the cooling module 100 visible in FIG. 1, and the ring 501 extends substantially at the center of this partition 50.

More specifically, the partition 50 of the ventilation member 5 has the overall shape of a rectangle of which the long sides, which are mutually parallel, are directed across the width of the cooling module 100, embodied by the direction of the transverse axis Y, and of which the short sides, which are mutually parallel and perpendicular to the aforementioned long sides, are directed along the above height of the cooling module 100, embodied by the direction of the vertical axis Z.

As shown in FIG. 8, the edges of the partition 50, respectively denoted 50a, 50b, 50c, 50d, are curved in the direction of the thickness of the cooling module 100, which direction is embodied by the direction of the longitudinal axis X. In other words, the edges 50a, 50b, 50c, 50d of the partition 50 of the ventilation member 5 are curved in a direction perpendicular to the main plane of extension 500 of the ventilation member 5 and to the main plane of extension 150 of the cooling module 100. Each of the curved edges of the partition extends toward the front of the cooling module, namely toward the duct 1 so as to form, with the central wall of the partition, a bowl capable of housing components of the cooling module and notably of partially housing the second heat exchanger.

According to the invention, the ventilation member 5 comprises a covering lip 51 which extends one of the curved edges of the partition 50, perpendicular to the latter.

According to the example more particularly described and illustrated here, the covering lip forms a continuation, in the direction of the axis X, namely in the direction of the thickness of the cooling module 100, of a curved edge 50a of the partition 50, arbitrarily referred to in what follows as the curved upper edge 50a of the ventilation member 5, while the other three curved edges 50b, 50c, 50d have dimensions, measured perpendicular to the main plane of extension 500 of the ventilation member 5, that are substantially identical.

The covering lip 51 extends, with reference to the directions and orientations defined hereinabove, over the entirety of the width of the ventilation member 5. According to other examples which are not depicted in the figures, the covering lip 51 may simultaneously extend the aforementioned curved upper edge 50a and at least partially extend one of the curved edges 50b, 50d adjacent to this upper edge, so that the covering lip 51 then makes a right angle.

According to the example more particularly illustrated in the figures, the covering lip 51 is formed of a first part 51a, perpendicular to the curved upper edge 50a and substantially parallel to the main plane of extension 500 of the partition 50 of the ventilation member 5, and of a second part 51b, substantially perpendicular to the aforementioned main plane of extension 500. More specifically, according to the example illustrated in FIG. 8, the first part 51a of the covering wall extends in the direct continuation of the curved upper edge 50a, perpendicular to this curved edge, and the second part 51b of the covering lip 51 extends, from the opposite end of the main part 51a to the main wall, perpendicular to the main plane of extension 500 of the ventilation member 5, in the same direction as the curved edges 50a, 50b, 50c, 50d, namely, in the cooling module 100 and with reference also to FIG. 1, in the direction of the air inlet 10 of the cooling module 100.

This results in a raised position of the second part 51b of the covering wall 50, which means that, as shown in FIG. 1, in the cooling module 100, the second part 51b of the covering lip 51 bears against the upper panel 20a of the covering wall 2, while the curved upper edge 50a lies at substantially the same height as this upper panel 20a. Advantageously, the dimension, in the height direction of the ventilation member 5, of the first part 51a of the covering lip 51, is defined such as to ensure that the second part 51b of the covering wall takes up a position, in the cooling module 100, bearing above the upper panel 20a of the covering wall 2, while accounting for any dimensional discrepancies of the covering wall 2 and of the partition 50 of the ventilation member 5, particularly in the height direction of the cooling module 100.

In the example illustrated, the covering lip 51 is slightly inclined with respect to a plane of extension of the upper panel 20a of the covering wall 2, so that the free end of the second part 51b of the covering lip 51, opposite to the first part 51a of the covering lip 51, points toward the upper panel 20a. In this way, when the cooling module 100 is assembled, this ensures that the covering lip 51 will come to bear against the upper panel 20a.

It should be noted in this context that the dimensioning of the covering lip 51, a step-function shape of the covering lip, and the fact that the free end of the second part 51b is positioned some distance from the curved upper edge 50a, mean that this covering lip can be given a degree of flexibility which contributes to keeping the covering lip 51 bearing against the upper panel 20a.

The ventilation member 5 comprises two locking members 52, 52' each of which extends from a first curved lateral edge 50b, namely from a first short side of the partition 50. As is more particularly visible in FIG. 0, the locking members 52, 52' are arranged from the relevant curved edge 50b and project out from this curved edge in a direction parallel to that of the width, as embodied by the transverse axis Y, of the ventilation member 5, namely away from the partition 50. In a cooling module 100 equipped with a ventilation member 5 like the one illustrated in FIG. 9, and as shown in FIG. 1, the locking members 52, 52' extend toward the outside of the cooling module 100 in the width direction thereof.

A first locking member 52 is arranged in the vicinity of the curved upper edge 50a of the partition 50 of the ventilation member 5, and a second locking member 52' is arranged in the vicinity of the opposite edge to the curved upper edge, namely a curved lower edge 50c of the partition 50.

According to the example illustrated in FIG. 9, a locking member 52, 52' comprises a first element 520 and a staple 521 as previously mentioned.

The first element 520 is substantially in the shape of a U of which the base is substantially parallel to the main plane of extension 500 of the ventilation member 5 and of which the branches, which are substantially mutually parallel, are substantially perpendicular to the aforementioned main plane of extension 500 by being respectively directed away from the curved edges 50a, 50b, 50c, 50d of the partition 50.

The staple 521 extends from the base of the U formed by the first element 520 and, together with the first element 520, forms a receiving slot 522 closed on the side of the curved upper edge 50a and of the covering lip 51, and open on the side of the opposite curved lower edge 50c, the receiving slot 522 extending in a main direction which, give or take the manufacturing tolerances, is substantially parallel to the main plane of extension 500 of the ventilation member 5.

The ventilation member 5 also comprises two retaining members 53, 53' which extend from the curved edge corresponding to the second short side 50d opposite to the first short side 50b, in the continuation of the partition 50, in the direction of the outside of the ventilation member 5. A first retaining member 53 is arranged in the vicinity of the curved upper edge 50a of the partition 50 of the ventilation member 5, and a second retaining member 53' is arranged in the vicinity of the previously defined curved lower edge 50c of the aforementioned partition 50.

According to the nonlimiting example more particularly illustrated in FIG. 1, each retaining member 53, 53' takes the form of a tab substantially parallel to the main plane of extension 500 of the ventilation member 5. The first retaining member 53 is pierced with a receiving orifice to receive, for example, a fixing screw or rivet, so that this screw or rivet can pass through the retaining member 53 and collaborate with the corresponding orifice in the securing tab 43 on the second heat exchanger 4. The second retaining member 53' collaborates with the support element 43' by coming into abutment with a bottom of the accommodating housing 430' of this support element 43'.

According to an embodiment which has not been depicted, the ventilation member 5 can be fixed directly to the duct 1.

Once the cooling module 100 has been obtained by assembling the duct 1, the first heat exchanger 3, the second heat exchanger 4 and the ventilation member 5 with one another, the cooling module 100 is mounted in the vehicle, at a front face thereof, via the fixing members 47 borne by the second heat sink 4.

The foregoing description clearly indicates that the invention meets its set objectives by proposing a cooling module comprising an air conveying duct configured to allow direct fixing of at least one heat exchanger. As may have been specified hereinabove, such a configuration makes it possible to limit the number of component parts needed for creating the cooling module, particularly by dispensing with the need for a frame to which the heat exchangers are fixed and to which the duct is also attached. Such an arrangement is particularly advantageous in instances in which the duct comprises fixing elements for fixing each heat exchanger present in the cooling module.

The invention is not limited to the means and configurations described and illustrated, however, and also applies to all equivalent means or configurations and to any combination of such means.

The invention claimed is:

1. A cooling module for a motor vehicle, comprising:
at least one heat exchanger; and
at least one duct comprising an air inlet of the cooling module, the duct being configured to convey cooling air from the air inlet toward the heat exchanger, wherein the duct comprises:
fixing elements configured for fixing the heat exchanger to the duct, and
first fixing elements arranged projecting from an internal face of the duct so as to house a first heat exchanger in a housing defined at least in part by a covering wall of the duct;
the cooling module further comprising two heat exchangers and wherein the duct comprises the first fixing elements configured for fixing the first heat exchanger to the duct, and second fixing elements configured for fixing a second heat exchanger to the duct; and
wherein the duct comprises an air outlet, extending in a plane parallel to a plane of extension of the cooling module, and the covering wall bordering the air outlet and defined by a plurality of panels extending perpendicular to the plane of extension of the cooling module.

2. The cooling module as claimed in claim 1, wherein the covering wall comprises at least two opposing lateral panels arranged one on each side of the air outlet, first fixing elements being distributed over a first lateral panel and over a second lateral panel.

3. The cooling module as claimed in claim 1, wherein the covering wall is configured to longitudinally cover each edge of the first heat exchanger.

4. The cooling module as claimed in claim 1, wherein the second fixing elements are arranged projecting from an external face of the duct so as to position the second heat exchanger facing the first heat exchanger, on an outside of said housing.

5. The cooling module as claimed in claim 1, wherein the second heat exchanger comprises fixing members configured for fixing the cooling module to the motor vehicle.

6. The cooling module as claimed in claim 1, comprising a ventilation member configured to force the cooling air to enter the cooling module, the ventilation member being rendered indissociable from the duct and/or from the at least one heat exchanger.

7. The cooling module as claimed in claim 1, wherein the fixing elements are formed as one with the duct.

* * * * *